United States Patent
Wiedmann (10) Patent No.: US 10,456,797 B2
(45) Date of Patent: Oct. 29, 2019

(54) PORTABLE SPRAY APPARATUS HAVING A CARRIER FRAME

(71) Applicant: Andreas Stihl AG & Co. KG, Waiblingen (DE)

(72) Inventor: Hans-Georg Wiedmann, Backnang (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 345 days.

(21) Appl. No.: 14/679,697

(22) Filed: Apr. 6, 2015

(65) Prior Publication Data
US 2015/0290663 A1 Oct. 15, 2015

(30) Foreign Application Priority Data
Apr. 9, 2014 (DE) .................. 10 2014 005 188

(51) Int. Cl.
*B05B 7/24* (2006.01)
*A01M 7/00* (2006.01)
*B05B 7/00* (2006.01)

(52) U.S. Cl.
CPC ......... *B05B 7/2475* (2013.01); *A01M 7/0021* (2013.01); *B05B 7/0081* (2013.01)

(58) Field of Classification Search
CPC ... B05B 7/0081; B05B 7/2475; B05B 15/061; A01M 7/0021
USPC ........................................ 239/152, 153, 154
See application file for complete search history.

(56) References Cited

U.S. PATENT DOCUMENTS

| 2,958,155 | A | * | 11/1960 | Heinz | ................. | A01M 7/0021 |
| | | | | | | 222/130 |
| 3,586,238 | A | * | 6/1971 | Schmierer | ............. | A01M 11/00 |
| | | | | | | 123/2 |
| 3,826,426 | A | * | 7/1974 | Bonvicini | ........... | A01M 7/0085 |
| | | | | | | 239/127 |
| 6,619,409 | B2 | * | 9/2003 | Iida | ..................... | B27B 17/0033 |
| | | | | | | 173/162.1 |
| 6,729,558 | B1 | | 5/2004 | Seenauth | | |
| 6,901,900 | B2 | * | 6/2005 | Matsubayashi | ......... | F02B 63/02 |
| | | | | | | 123/185.3 |
| 7,309,028 | B2 | * | 12/2007 | Langhans | ............. | B05B 7/1427 |
| | | | | | | 222/175 |

(Continued)

FOREIGN PATENT DOCUMENTS

| CN | 2625046 Y | 7/2004 | | |
| DE | 102007023409 A1 | * 11/2008 | ........... | B05B 7/1413 |

(Continued)

*Primary Examiner* — Chee-Chong Lee
*Assistant Examiner* — Steven M Cernoch
(74) *Attorney, Agent, or Firm* — Walter Ottesen, P.A.

(57) ABSTRACT

The invention relates to a portable spray apparatus having a carrier frame, a blower and a storage vessel for a medium to be discharged. An upper unit with the storage vessel and a lower unit with the blower are retained on the carrier frame. The two units are located in the vertical direction of the carrier frame at a spacing (z) from each other. The spacing (z) is selected so that a movement gap is formed between the upper unit and the lower unit. To limit the resilient deflection of the upper unit, there is arranged on one of the units a damping stop which limits the movement gap and damps a resilient deflection of the upper unit by abutment of the damping stop on the other one of the units.

20 Claims, 6 Drawing Sheets

(56) References Cited

U.S. PATENT DOCUMENTS

| | | | | |
|---|---|---|---|---|
| 7,673,813 B2* | 3/2010 | Raffenberg | ......... | A01M 7/0021 |
| | | | | 137/595 |
| 7,854,396 B2* | 12/2010 | Wu | ...................... | A01C 23/008 |
| | | | | 239/152 |
| 9,061,301 B2* | 6/2015 | Bahr | ...................... | B05B 7/2475 |
| 9,538,711 B2* | 1/2017 | Mutoh | ................... | A01G 1/125 |
| 2006/0266308 A1 | 11/2006 | Leech et al. | | |
| 2014/0209705 A1* | 7/2014 | Bahr | ..................... | B05B 7/2475 |
| | | | | 239/152 |

FOREIGN PATENT DOCUMENTS

| | | | | |
|---|---|---|---|---|
| EP | 2 108 257 A1 | 10/2009 | | |
| GB | 1139998 A1 | 1/1969 | | |
| JP | 2003126737 A | * | 5/2003 | |
| JP | WO 2013065389 A1 | * | 5/2013 | ........... B05B 7/2475 |
| WO | 2013/065435 A1 | 5/2013 | | |

* cited by examiner

PORTABLE SPRAY APPARATUS HAVING A CARRIER FRAME

CROSS REFERENCE TO RELATED APPLICATION

This application claims priority of German patent application no. 10 2014 005 188.9, filed Apr. 9, 2014, the entire content of which is incorporated herein by reference.

FIELD OF THE INVENTION

The invention relates to a portable spray apparatus which includes a carrier frame, a fan unit and a storage container for a medium to be discharged.

BACKGROUND OF THE INVENTION

Such a spray apparatus is known. The carrier frame comprises a rear plate and two cantilever beams which are located perpendicularly to the rear plate and which carry a first unit having a storage container and a second unit having a fan unit. The medium which is to be discharged by the fan unit is stored in the storage container and supplied to the blow pipe of the fan unit by means of a suitable conveyor. The units which are retained on the cantilever beams are located in a vertical direction of the carrier frame with spacing from each other, a movement gap being formed between the first, upper unit with the storage container and the second, lower unit with the fan unit.

If the spray apparatus is removed from the back and placed in a hard manner on the ground—in particular when the storage container is well filled—considerable deflections of the upper unit relative to the lower unit may occur. In this instance, the upper cantilever beam can be deflected significantly, which may lead to damage.

SUMMARY OF THE INVENTION

An object of the invention is to provide a portable spray apparatus with a carrier frame and units which are secured thereto having a storage container and a fan unit in such a manner that resilient deflection of the upper unit in the event of an impact load is limited.

The portable spray apparatus of the invention includes: a carrier frame defining an upward direction; a blower; a supply vessel for holding the medium to be applied by the spray apparatus; an upper unit including the supply vessel and being configured to be held on the carrier frame; a lower unit having the blower and being configured to be held on the carrier frame; the upper and lower units being disposed in the upward direction at a distance (z) from each other; the distance (z) being selected so as to form a movement gap between the upper unit and the lower unit; and, a damping stop arranged on one of the upper unit and the lower unit and configured to delimit the movement gap and dampen an elastic deflection of the upper unit by a contact engaging of the damping stop on the other one of the upper unit and the lower unit.

There is arranged on one of the units a damping stop element which limits the movement gap between the upper unit and the lower unit; advantageously, the damping stop element protrudes into the movement gap. As a result of the damping stop element, the resilient deflection of the first, upper unit is limited, for example, by means of abutment of the stop element on the lower unit. This limitation of the resilient deflection of the upper unit is carried out over the path of an occurring resilient deflection in a damping manner, that is, no hard stop takes place.

Advantageously, the stop element is arranged on the upper unit, for example, constructed as a path limiter which protrudes in the direction towards the lower unit.

It may also be advantageous to form the stop element from two stop parts which can be moved relative to each other, a first stop part being secured to the upper unit and a second stop part being secured to the lower unit. If the stop parts engage one in the other in a telescopic manner, the movement gap is sealed off with respect to foreign bodies.

The stop element itself is preferably constructed as a damping element; rubber is particularly suitable as a material for the damping element.

The stop element includes a resilient damping part and a retention member, the damping part and the retention member being located one behind the other in series. The damping part preferably includes rubber, while the retention member is constructed as a rigid retention member.

The second, lower unit is retained on the carrier frame by anti-vibration elements. The second, lower unit is thus decoupled from the carrier frame so as to be independent of the first, upper unit, the anti-vibration elements being able to be constructed as damping elements.

As a result of the construction of the stop element between the upper unit and the lower unit as a damping element and the arrangement of the anti-vibration elements between the second unit and the carrier frame, there is produced over the path of the resilient deflection of the upper cantilever beam a force/path graph with different damping steps. As a result of the contact engagement or abutment of the stop element in the movement gap on the opposing unit, there is formed a first damping step which is determined by the softness of the damping element. If the stop element in the movement gap is compressed, that is, the damping travel is exhausted, the anti-vibration elements of the second, lower unit act as the next damping step. This next damping step is determined in terms of the characteristic thereof by the properties of the anti-vibration elements of the lower, second unit.

In a specific embodiment, the storage vessel of the first unit is retained with a first, upper cantilever beam on the carrier frame. The second unit with the fan unit and advantageously the drive motor is retained on the carrier frame with a second, lower cantilever beam. The cantilever beams support the units and direct the support forces into the carrier frame.

The second unit, advantageously the fan unit with the drive motor, is located between the first, upper cantilever beam and the second, lower cantilever beam. The upper, first cantilever beam is therefore located between the second unit comprising the fan unit and drive motor and the storage vessel of the spray apparatus.

As a result of the construction of the spray apparatus according to the invention, the deflection of the first, upper cantilever beam is limited by the second, lower cantilever beam. It is consequently ensured that, with a carrier frame comprising plastics material, mechanical damage to the upper cantilever beam by an excessively large deflection is avoided. Advantageously, the stop element is secured to the first, upper cantilever beam.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
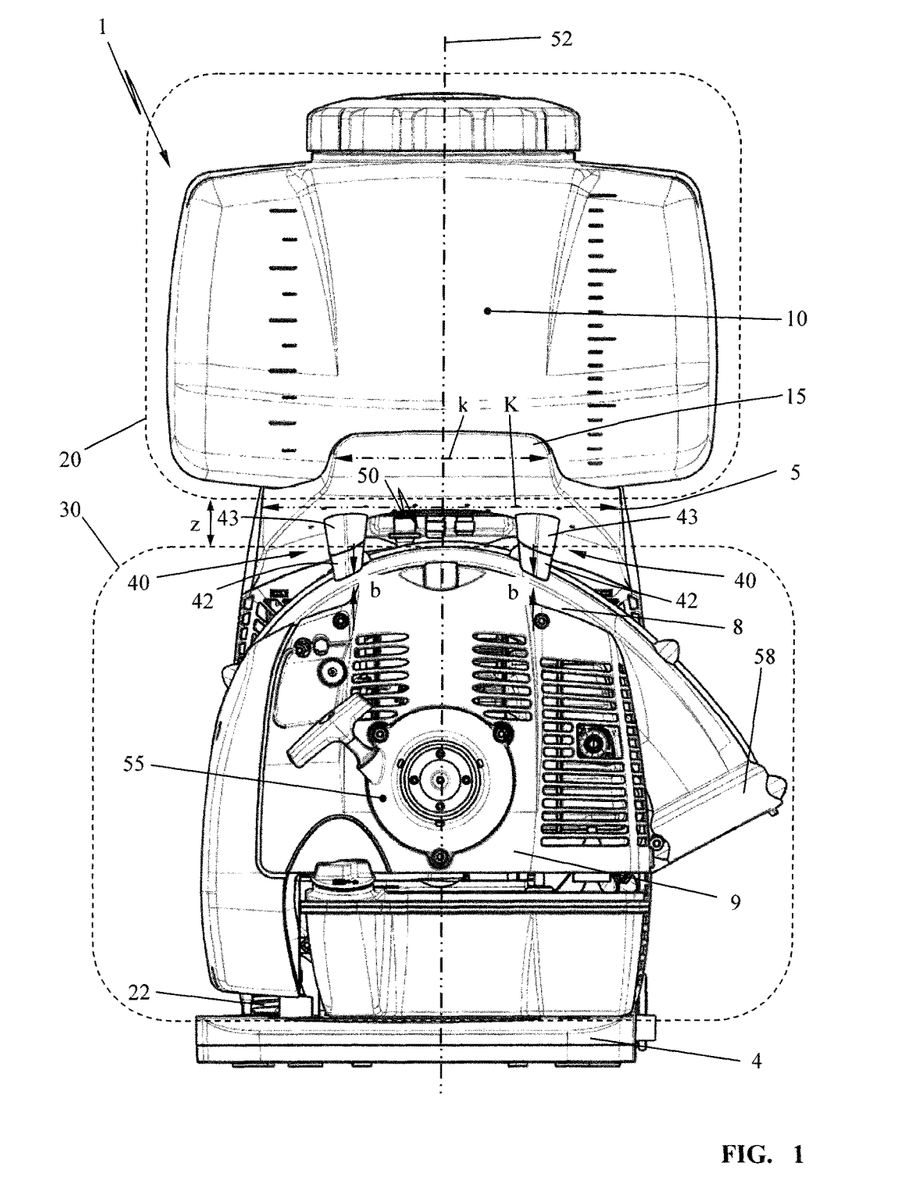
FIG. 1 is a rear elevation view of a spray apparatus.
Figure 2:
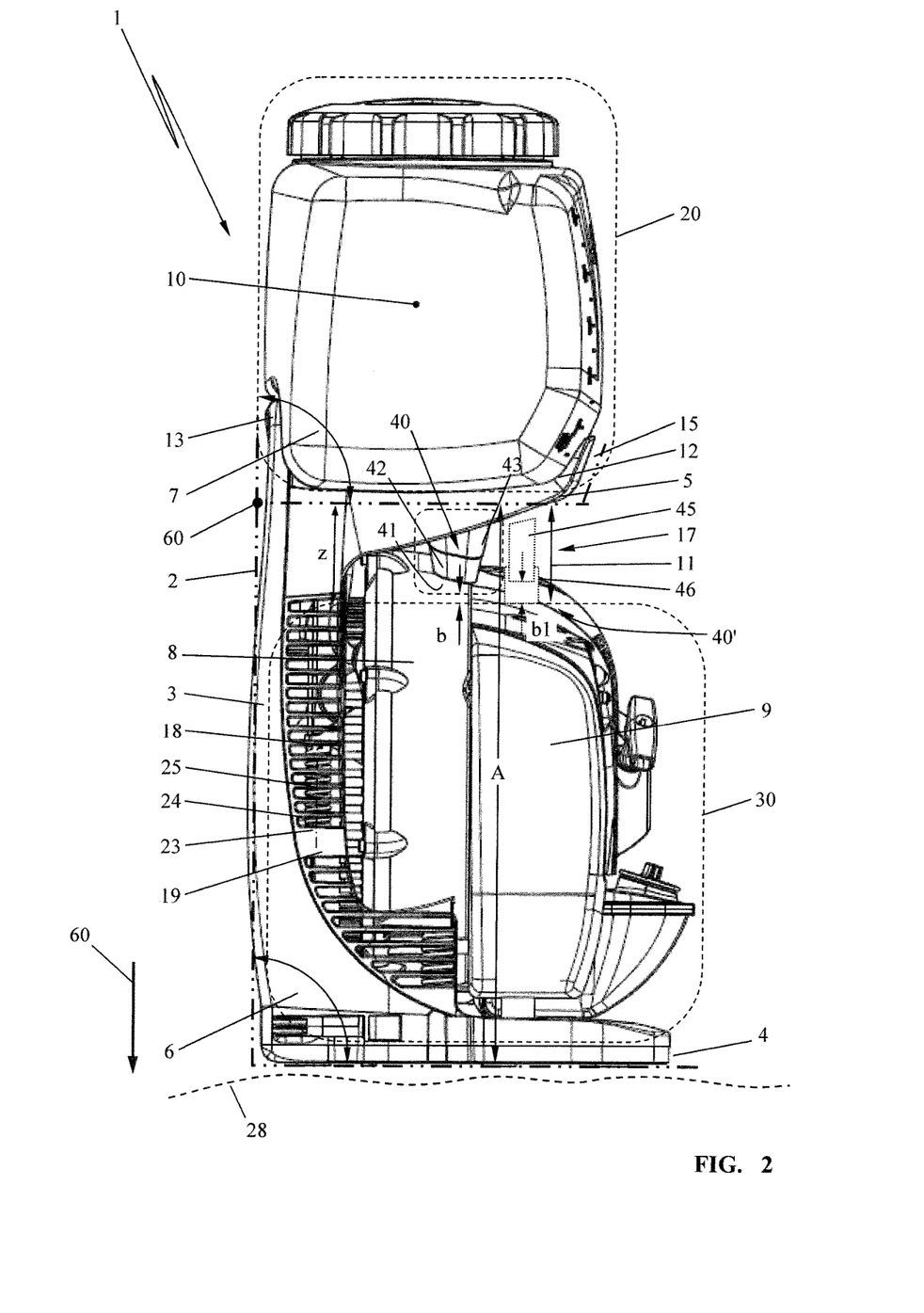
FIG. 2 is a side elevation view of the spray apparatus of FIG. 1 with a schematic of a stop element arranged between the upper unit and the lower unit.
Figure 3:
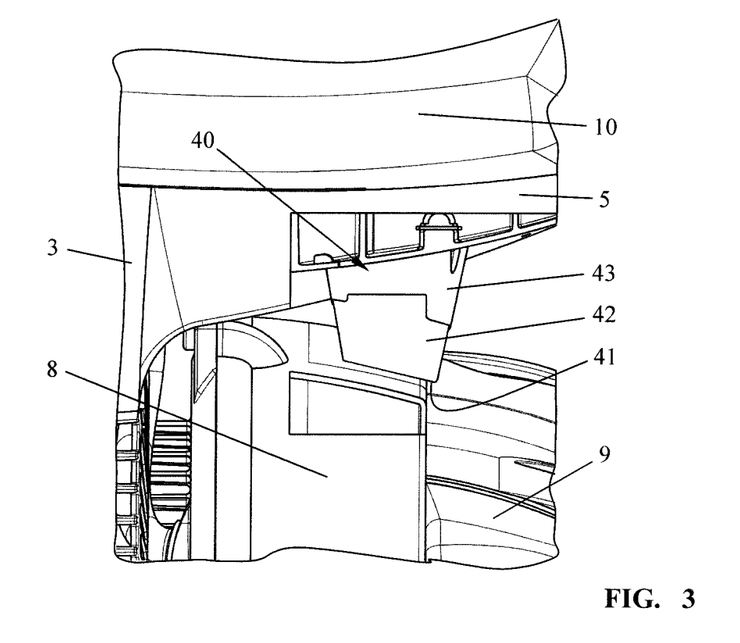
FIG. 3 is an enlarged view of the stop element in the movement gap.
Figure 4:
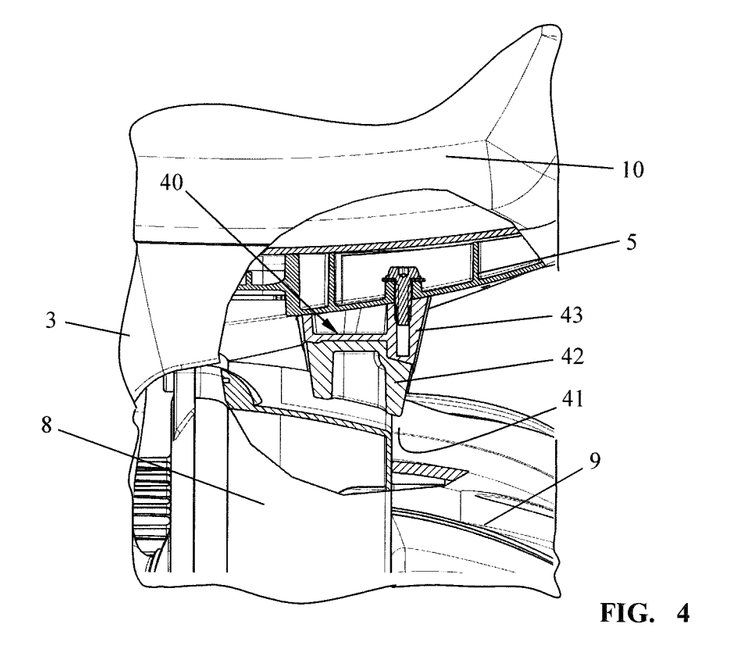
FIG. 4 is a cross-section through the stop element of FIG. 3.

The spray apparatus shown in FIGS. 1 and 2 is a back-mounted spray apparatus 1 and comprises a carrier frame 2 which is intended to be carried on the back of a user.

As shown in FIG. 2, the carrier frame 2 substantially comprises a rear plate 3 which is secured to the back of a user and which has a first, lower cantilever beam 4 and a second upper cantilever beam 5. The cantilever beams 4 and 5 substantially adjoin the rear plate 3 at a right angle 6 and 7; the carrier frame 2 comprising the rear plate 3 and the cantilever beams 4 and 5 is especially produced from plastics material. Advantageously, the rear plate 3 and the cantilever beams 4 and 5 are constructed as a single component.

There is supported on the lower cantilever beam 4 a fan unit 8, which is driven by an internal combustion engine 9, in particular a two-stroke engine or a four-stroke engine. An electric motor may also be provided as a drive motor.

On the upper cantilever beam 5, there is retained a storage container 10 in which a medium which is intended to be discharged by the fan unit 8 is received. The storage container 10 may be constructed integrally with the cantilever beam 5; in particular, the carrier frame 2 and the storage container 10 form a structural unit and are produced from one component, for example, plastics material.

As can be seen from the rear view according to FIG. 1, an upper, first unit 20 is constructed symmetrically with respect to a longitudinal center axis 52, the cantilever beam 5 tapering in the direction towards the free end 15 thereof. In the connection region of the cantilever beam 5 with respect to the rear plate 3, the cantilever beam 5 has a width K which advantageously corresponds to the width of the rear plate 3. In the region of the free end 15 thereof, the cantilever beam 5 has a smaller width (k). With respect to the longitudinal center axis 52, the cantilever beam 5 is constructed in a symmetrical manner.

The drive motor 9 having a fan unit 8 is retained on the lower cantilever beam 4, the fan unit 8 having a fan outlet 58 for connecting a fan pipe. Approximately centrally with respect to the fan unit 8, there is provided a pull-rope starter 55 for starting the drive motor 9, which is an internal combustion engine in the embodiment shown.

In the embodiment shown, the storage container 10 forms the first unit 20; a second unit 30 comprises the fan unit 8 and—in the embodiment—also the drive motor 9 which drives the fan unit 8.

The first unit 20 is retained in the upper region of the carrier frame 2; in the embodiment, the storage container 10 is secured to the first, upper cantilever beam 5. The second unit—in the embodiment, the fan unit 8 and the drive motor 9—are secured in the lower region of the carrier frame 2; in the embodiment, the second unit is retained on the lower, second cantilever beam 4. The cantilever beams 4 and 5 have such a spacing A from each other that, between the first unit 20 and the second unit 30, a spacing (z) remains and forms a free space 11. The cantilever beams 4 and 5 are located substantially parallel with each other; the upper cantilever beam 5 engages around the lower edge region 12 of the storage container 10 with the free end 15 thereof so that it is retained between the angled free end 15 of the cantilever beam 5 and the upper edge 13 of the rear plate 3. The storage container 10 is connected to the cantilever beam 5 in a non-releasable manner by securing means.

The free space 11 forms a movement gap 17 between the upper unit 20 with the cantilever beam 5 and the lower unit 30 with the lower cantilever beam 4.

Figure 5:
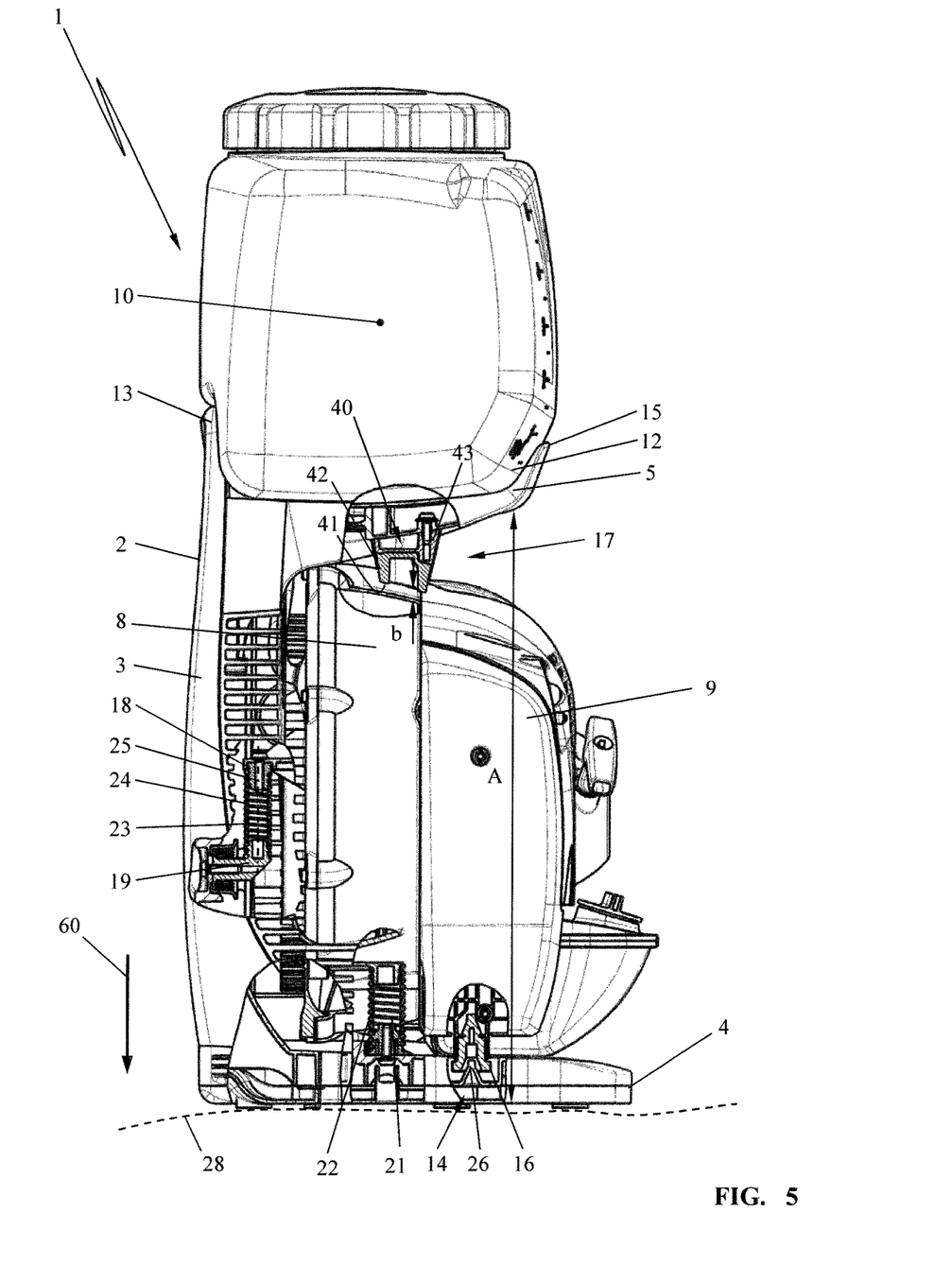
FIG. 5 is a side elevation view of the spray apparatus of FIG. 2 with partially sectioned stop elements and damping elements.
Figure 6:
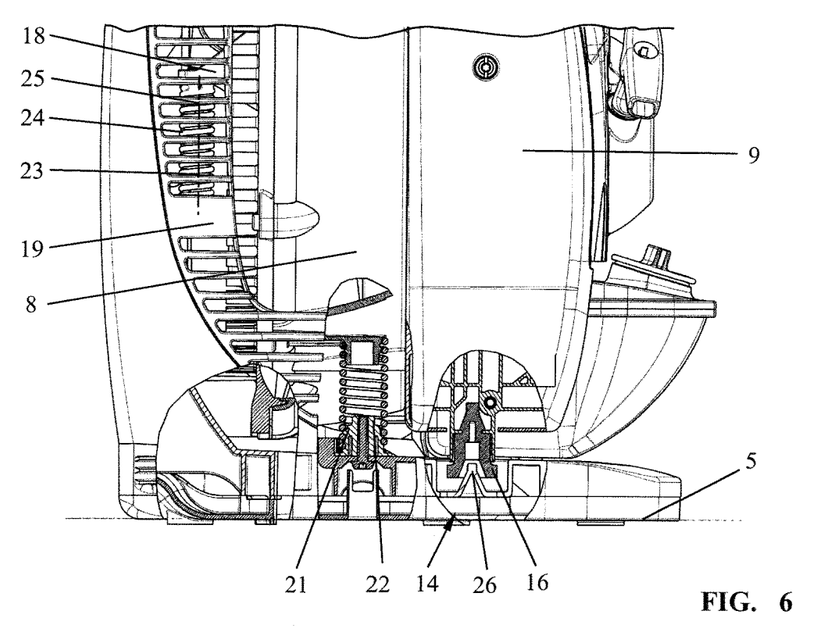
FIG. 6 is an enlarged view of the support of the fan unit by anti-vibration elements.

As shown in particular in FIG. 5, the fan unit 8 with the drive motor 9, that is, the lower unit 30, is supported on the lower cantilever beam 4 with an anti-vibration element 22. Over the width of the rear plate 3, there are preferably provided two anti-vibration elements 22 which are constructed in the embodiment shown as helical springs 21. A first end of the helical spring 21 is secured to the unit 30, the other end of the helical spring 21 is secured to the lower cantilever beam 4. The longitudinal axis of the helical spring 21 is located vertically on the cantilever beam 4 and is located substantially parallel with the rear plate 3. Between the fan unit 8 and the rear plate 3, there is arranged another anti-vibration element 24 which also comprises a helical spring 23. The longitudinal axis 25 of the helical spring extends along the rear plate 3; the one end of the helical spring 23 is connected to the fan unit 8 by a retention member 18 and the other end is connected to the carrier frame 2 by a retention member 19.

The windings of the helical springs 21 and 23 are located with spacing from each other so that oscillations of the drive unit 9 or the fan unit 8 are decoupled from the carrier frame 2. An end stop 14 between the cantilever beam 4 and the unit 30, in the embodiment, the drive motor 9, delimits a compression of the helical springs 21 and 23 in the direction of the longitudinal axis 25 thereof. To this end, there is provided a resilient stop 16 which cooperates with a counter-stop 26. The resilient stop 16 determines the damping of the second unit 30 with respect to the carrier frame 2 as long as the maximum damping path (d) (FIG. 7) of the anti-vibration elements 22 and 24 has been traveled.

The second unit 30 is arranged between the first, upper cantilever beam 5 and the second, lower cantilever beam 4. The first unit 20 is arranged on the cantilever beam 5.

The movement gap 17 formed between the upper cantilever beam 5 and the second unit 30 comprising the fan unit 8 and drive motor 9 enables resilient deflection of the first unit 20 relative to the second unit 30 in the event of an impact load of the carrier frame 2 by depositing the carrier frame 2 on the ground 28. In the embodiment, the upper cantilever beam 5 is resiliently deflected in the direction towards the second unit 30 when placed on the ground 28 in a hard manner.

In order to limit the resilient deflection of the upper unit 20 or the upper cantilever beam 5, there is provided a stop element 40 which limits the movement gap 17; in the embodiment, it protrudes into the movement gap 17. The stop element 40 is arranged in such a manner that the free end 41 thereof, after overcoming a spacing (b), moves into abutment with the second, lower unit 30. The spacing (b) corresponds in this instance to a maximum deflection of the upper unit 20 relative to the lower unit 30. In the embodiment, the spacing (b) is constructed in such a manner that a resilient deflection of the upper cantilever beam 5 is limited in a damping manner.

In a first embodiment shown, the stop element 40 is arranged on the upper unit 20, preferably on the cantilever beam 5 of the upper unit 20.

In the embodiment shown, the stop element 40 comprises a resilient damping portion 42 which is retained in a retention member 43. The retention member may be constructed as a rigid retention member. The stop element and the retention member are located in series one behind the other.

The stop element 40, which is constructed as a damping element, preferably comprises rubber. Other resilient materials may also be advantageous.

The degree of damping of the resilient deflection of the cantilever beam 5 is dependent on the magnitude of the deflection. The damping is carried out in sequential damping steps I to IV. The slope of the characteristic line in the damping steps I to IV is different. Preferably, the slope of the characteristic line of the damping steps I to IV is steeper from step to step.

Figure 7:
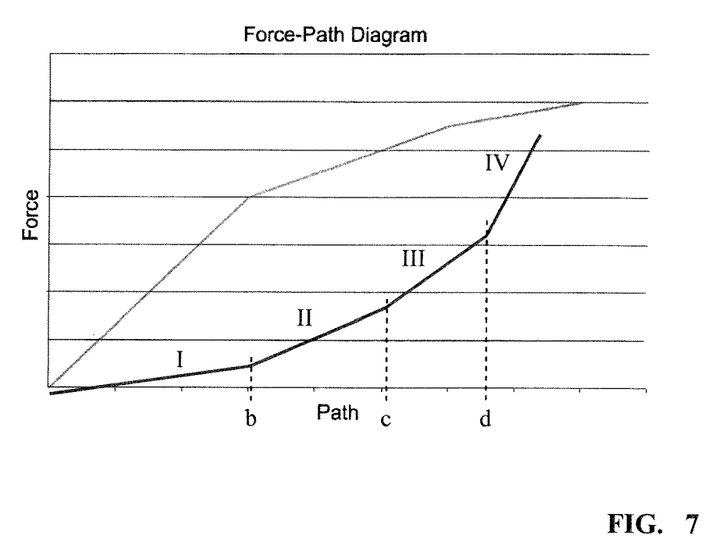
FIG. 7 is a force/path graph of the damping.

FIG. 7 shows a force/path graph for resilient deflection of the cantilever beam 5 with different damping steps I to IV. Firstly, in the first portion the damping step I is provided by the resilient deflection of the upper cantilever beam 5 because of the resilient properties thereof. If the spacing (b) of the damping stop element 40 is overcome, in the event of further deflection of the cantilever beam 5, the damping portion 42 has to be resiliently deformed; accordingly, the force over the path increases. The characteristic line of the damping step II becomes steeper. If the anti-vibration elements are pressed together by the action of the force of the cantilever beam 5 via the stop element 40 on the second unit 30, there is another damping step III after a path (c) (FIG. 7). The steeper characteristic line of the force/path graph is determined by the anti-vibration elements 22 and 24. If the anti-vibration elements (22, 24) are also pressed together, the resilient stop 16 is in abutment with the counter-stop 26 of the lower cantilever beam 4, whereby—after the path (d)—the arrangement becomes even steeper and the force/path graph shows from (d) another bend, that is, the characteristic line becomes even steeper. The resilient support of the cantilever beam 5 is consequently carried out in a plurality of damping steps I to IV, there being provided when the stop element 40 is in abutment with the opposing unit 30 and during the resilient deformation of the stop element 40 another damping step III whose characteristic is determined by the properties of the anti-vibration elements (22, 24) of the lower, second unit 30. If the damping travel of the anti-vibration elements 22 and 24 is also used up, the resilient stop 16 of the lower unit 30 runs against the counter-stop 26 of the lower cantilever beam 4, whereby a third damping step IV is formed. The characteristic line of the force/path graph becomes steeper from damping step to damping step.

The deflection of the first, upper cantilever beam 5 is—at the end of the damping steps I to IV—limited by the second, lower cantilever beam 4.

Alternatively, the stop element 40' arranged in the movement gap 17 may comprise two stop portions 45 and 46 which can be moved relative to each other, a first stop portion 45 being able to be secured to the upper unit 20, for example, to the cantilever beam 5 thereof, and a second stop portion 46 being secured to the lower unit 30. In this instance, it may be advantageous for the stop portions 45 and 46 to engage one in the other in the manner of a telescope.

The stop portions (45, 46) are located with a spacing b1 with respect to each other. After overcoming the spacing b1, the further deflection of the cantilever beam 5 is damped, preferably in sequential damping steps with different gradients.

Figure 8:
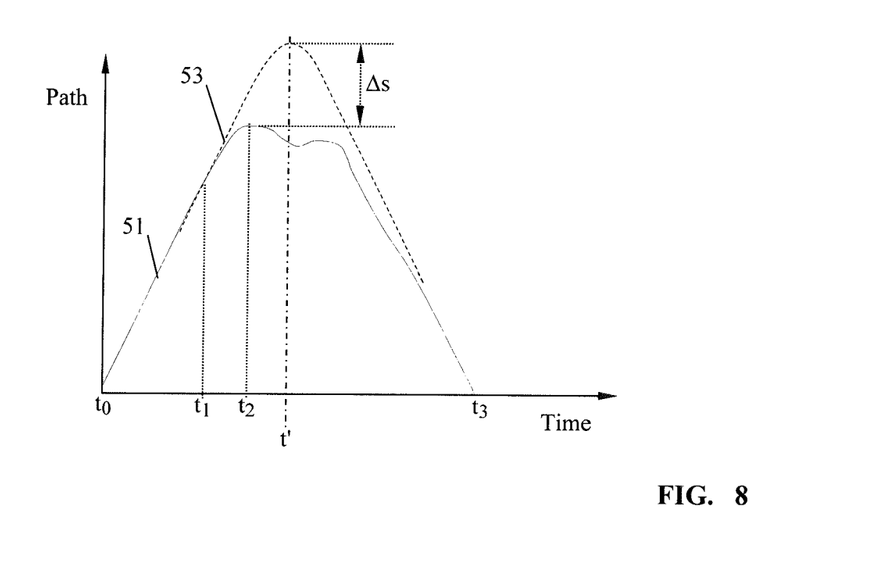
FIG. 8 is a path/time graph of the deflection when the spray apparatus is placed on the ground in a hard manner.

FIG. 8 shows the path of the deflection of the upper unit 20 relative to the lower unit 30 in the event of a hard placement in the ground 28 in the direction of the arrow 60 (FIGS. 2 and 5). If it is assumed that the storage container is well filled, for example, a storage container having from 15 to 18 liters of receiving space, when placed on the ground 28, the cantilever beam 5 is deflected in the region of the free end 15 thereof. In this instance, the stop elements 40 which are arranged symmetrically to the right and left of the longitudinal center axis 52, will overcome the spacing (b) with respect to the lower unit 30 and will be supported on the housing of the fan unit 8. In FIG. 8, this corresponds to the time $t_1$; at the time $t_0$, the spray apparatus strikes the ground 28. The path traveled between $t_0$ and $t_1$ corresponds to the resilient deflection of the cantilever beam 5 at the free end 15 thereof. As a result of the placement of the stop elements 40 at the time $t_1$, the further resilient deflection of the cantilever beam 5 is damped; the resilient deflection becomes smaller. At the time $t_2$, the damping travel of the stop elements 40 is used up in the same manner as the travel of the anti-vibration elements 22 of the second unit 30 is used up. The force acting as a result of the impact on the ground 28 decreases again so that the path of the deflection becomes smaller again and, at the time $t_3$, the original state (no deflection) is reached.

Without the stop element 40 according to the invention, the path of the deflection would be considerably larger, as shown in FIG. 8 with dashed lines. This path of the deflection would reach a maximum at time t'.

As a comparison between the continuous line 51 and the broken line 53 shows, a reduced path Δs of the deflection is produced, whereby the mechanical loading of the carrier frame is reduced in the region of the retention of the storage container 10, in the embodiment, the mechanical loading of the cantilever beam 5.

It is understood that the foregoing description is that of the preferred embodiments of the invention and that various changes and modifications may be made thereto without departing from the spirit and scope of the invention as defined in the appended claims.

What is claimed is:

1. A portable spray apparatus comprising:
a carrier frame defining an upward direction;
a blower;
a supply vessel for holding a medium to be applied by the spray apparatus;
an upper unit including said supply vessel and being configured to be held on said carrier frame;
a lower unit having said blower and being configured to be held on said carrier frame;
said upper and lower units being disposed in said upward direction at a distance (z) from each other;
said distance (z) being selected so as to form a movement gap between said upper unit and said lower unit;
a damping stop fixed on said upper unit and configured to delimit said movement gap and dampen an elastic deflection of said upper unit by a contact engaging of said damping stop on said lower unit;
said damping stop having a free end and being so mounted on said upper unit so as to cause said free end to come into contact with said lower unit after overcoming a spacing (b);

said damping stop being arranged such that:
    in a first state, wherein said upper unit is not deflected out relative to said lower unit, said damping stop is only in contact with said upper unit; and,
    in a second state, wherein said upper unit is deflected out relative to said lower unit and said spacing (b) has been overcome, said damping stop is in contact with said lower unit and said damping stop acts to dampen via elastic deformation.

2. The portable spray apparatus of claim 1, wherein said damping stop is made of rubber.

3. The portable spray apparatus of claim 2, wherein said damping stop includes a holder and an elastic damping section arranged one behind the other in series.

4. The portable spray apparatus of claim 3, wherein said elastic damping section is made of rubber.

5. The portable spray apparatus of claim 1, further comprising anti-vibration elements each having a first end and a second end; said lower unit being supported on said carrier frame with said anti-vibration elements; said first ends of said anti-vibration elements being fixed to said lower unit; and, said second ends of said anti-vibration elements being fixed to said carrier frame.

6. The portable spray apparatus of claim 5, wherein said lower unit has anti-vibration elements having predetermined properties; and, the contact engagement of said damping stop on said lower unit defines a first damping step and, after said contact engagement, a second damping step is formed having a characteristic defined by the predetermined properties of said anti-vibration elements.

7. The portable spray apparatus of claim 1, further comprising an upper cantilever holding said supply vessel of said upper unit on said carrier frame and a lower cantilever holding said blower on said carrier frame.

8. The portable spray apparatus of claim 7, wherein said lower unit is mounted between said upper cantilever and said lower cantilever.

9. The portable spray apparatus of claim 7, wherein said upper cantilever deflects during operational use of said spray apparatus; and, said lower cantilever is configured to delimit the deflection of said upper cantilever.

10. The portable spray apparatus of claim 7, wherein said carrier frame and said upper and lower cantilevers are made of plastic.

11. The portable spray apparatus of claim 1, wherein said distance (z) between said upper unit and said lower unit forms a free space.

12. The portable spray apparatus of claim 7, wherein:
said carrier frame includes a back plate configured to be attached to a user's back; and,
said upper cantilever and said lower cantilever each substantially adjoin said back plate at a right angle.

13. The portable spray apparatus of claim 1, wherein:
said upper unit defines a longitudinal center axis; and,
said upward direction of said carrier frame corresponds to said longitudinal center axis.

14. The portable spray apparatus of claim 1, wherein:
said damping stop is configured to dampen the elastic deflection of said upper unit through contact engagement of said damping stop with said lower unit in said upward direction of said carrier frame.

15. The portable spray apparatus of claim 1, wherein said spacing (b) corresponds to a maximum deflection of said upper unit relative to said lower unit.

16. The portable spray apparatus of claim 1, wherein the damping, which counters an elastic deformation of a force carrier, is made up of several damping stages.

17. A portable spray apparatus comprising:
a carrier frame defining an upward direction;
a blower;
a supply vessel for holding a medium to be applied by the spray apparatus;
an upper unit including said supply vessel and being configured to be held on said carrier frame;
a lower unit having said blower and being configured to be held on said carrier frame;
said upper and lower units being disposed in said upward direction at a distance (z) from each other;
said distance (z) being selected so as to form a movement gap between said upper unit and said lower unit;
said upper unit being disposed, in said upward direction, completely above said lower unit;
a damping stop arranged on said upper unit and configured to delimit said movement gap and dampen an elastic deflection of said upper unit by a contact engaging of said damping stop on said lower unit;
said damping stop having a free end and being so mounted on said upper unit so as to cause said free end to come into contact with said lower unit after overcoming a spacing (b);
said damping stop being arranged such that:
    in a first state, wherein said upper unit is not deflected out relative to said lower unit, said damping stop is only in contact with said upper unit; and,
    in a second state, wherein said upper unit is deflected out relative to said lower unit and said spacing (b) has been overcome, said damping stop is in contact with said lower unit and said damping stop acts to dampen via elastic deformation.

18. A portable spray apparatus comprising:
a carrier frame defining an upward direction;
a blower;
a supply vessel for holding a medium to be applied by the spray apparatus;
said carrier frame having a back plate configured to be attached to a user's back;
an upper unit including said supply vessel and being configured to be held on said carrier frame;
a lower unit having said blower and being configured to be held on said carrier frame;
said upper and lower units being disposed in said upward direction at a distance (z) from each other;
said distance (z) being selected so as to form a movement gap between said upper unit and said lower unit;
a damping stop arranged on said upper unit and configured to delimit said movement gap and dampen an elastic deflection of said upper unit by a contact engaging of said damping stop on said lower unit;
said damping stop having a free end and being so mounted on said upper unit so as to cause said free end to come into contact with said lower unit after overcoming a spacing (b);
said damping stop being arranged such that:
    in a first state, wherein said upper unit is not deflected out relative to said lower unit, said damping stop is only in contact with said upper unit; and,
    in a second state, wherein said upper unit is deflected out relative to said lower unit and said spacing (b) has been overcome, said damping stop is in contact with said lower unit and said damping stop acts to dampen via elastic deformation.

19. A portable spray apparatus comprising:
a carrier frame defining an upward direction;
a blower;

a supply vessel for holding a medium to be applied by the spray apparatus;

an upper unit including said supply vessel and being configured to be held on said carrier frame;

a lower unit having said blower and being configured to be held on said carrier frame;

said upper and lower units being disposed in said upward direction at a distance (z) from each other;

said distance (z) being selected so as to form a movement gap between said upper unit and said lower unit;

a damping stop fixed on said lower unit and configured to delimit said movement gap and dampen an elastic deflection of said upper unit by a contact engaging of said damping stop on said upper unit;

said damping stop having a free end and being so mounted on said lower unit so as to cause said free end to come into contact with said upper unit after overcoming a spacing (b);

said damping stop being arranged such that:
   in a first state, wherein said upper unit is not deflected out relative to said lower unit, said damping stop is only in contact with said lower unit; and,
   in a second state, wherein said upper unit is deflected out relative to said lower unit and said spacing (b) has been overcome, said damping stop is in contact with said upper unit and said damping stop acts to dampen via elastic deformation.

20. A portable spray apparatus comprising:

a carrier frame defining an upward direction;

a blower;

a supply vessel for holding the medium to be applied by the spray apparatus;

an upper unit including said supply vessel and being configured to be held on said carrier frame;

a lower unit having said blower and being configured to be held on said carrier frame;

said upper and lower units being disposed in said upward direction at a distance (z) from each other;

said distance (z) being selected so as to form a movement gap between said upper unit and said lower unit;

a damping stop, wherein said damping stop includes two stop parts movable relative to each other;

a first one of said two stop parts being mounted on said upper unit and a second one of said two stop parts being mounted on said lower unit;

said first one of said two stop parts and said second one of said two stop parts being configured to delimit said movement gap and dampen an elastic deflection of said upper unit by a contact engaging of said second one of said two stop parts on said first one of said two stop parts;

said first one of said two stop parts having a first free end;

said second one of said two stop parts having a second free end;

said first one of said two stop parts being so mounted on said upper unit and said second one of said two stop parts being so mounted on said lower unit so as to cause said first free end to come into contact with said second free end after overcoming a spacing (b);

said first one of said two stop parts and said second one of said two stop parts being arranged such that:
   in a first state, wherein said upper unit is not deflected out relative to said lower unit, said first one of said two stop parts is only in contact with said upper unit and said second one of said two stop parts is only in contact with said lower unit; and,
   in a second state, wherein said upper unit is deflected out relative to said lower unit and said spacing (b) has been overcome, said second one of said two stop parts is in contact with said first one of said two stop parts and said damping stop acts to dampen via elastic deformation.

\* \* \* \* \*